(12) United States Patent
Li et al.

(10) Patent No.: US 7,391,809 B2
(45) Date of Patent: Jun. 24, 2008

(54) SCALABLE VIDEO TRANSCODING

(75) Inventors: Shipeng Li, Redmond, WA (US); Lujun Yuan, Beijing (CN); Qi Chen, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 10/749,975

(22) Filed: Dec. 30, 2003

(65) Prior Publication Data

US 2005/0147163 A1    Jul. 7, 2005

(51) Int. Cl.
*H04N 7/12* (2006.01)

(52) U.S. Cl. .............................. 375/240.12; 375/240.05

(58) Field of Classification Search ................. 348/400, 348/401, 402, 403, 404, 588, 390, 405, 409, 348/413, 412, 411, 415, 416, 420, 38, 699, 348/700, 701, 405.1, 416.1, 420.1, 387, 70; 382/236, 107, 232, 235, 238, 239, 248, 250, 382/251; 386/240, 111, 4; 375/240.01, 240.12, 375/240.27, 240.15, 240.24, 240.03, 240.02, 375/240.18, 240.16, 240.21
See application file for complete search history.

(56) References Cited

U.S. PATENT DOCUMENTS

| | | | | |
|---|---|---|---|---|
| 6,226,328 B1 * | 5/2001 | Assuncao | .............. | 375/240.26 |
| 6,434,196 B1 * | 8/2002 | Sethuraman et al. | ... | 375/240.12 |
| 6,625,211 B1 * | 9/2003 | Etoh et al. | ............. | 375/240.03 |
| 6,647,061 B1 * | 11/2003 | Panusopone et al. | ... | 375/240.12 |
| 7,190,723 B2 * | 3/2007 | Schoenblum | .......... | 375/240.05 |
| 2004/0151249 A1 * | 8/2004 | Morel | .................... | 375/240.16 |
| 2004/0223735 A1 * | 11/2004 | Lin et al. | ....................... | 386/68 |
| 2005/0058197 A1 * | 3/2005 | Lu et al. | ................ | 375/240.03 |
| 2007/0165715 A1 * | 7/2007 | Yoshinari | ............... | 375/240.12 |

OTHER PUBLICATIONS

Assuncao, Pedro A.A., et al.; "A Frequency-Domain Video Transocder for Dynamic Bit-Rate Reduction of MPEG-2 Bit Streams"; IEEE Transactions on Circuits and Systems for Video Technology, vol. 8, No. 8, Dec. 1998; pp. 953-967.

* cited by examiner

*Primary Examiner*—Tung Vo
*Assistant Examiner*—Behrooz Senfi
(74) *Attorney, Agent, or Firm*—Lee & Hayes, PLLC

(57) ABSTRACT

A scalable video transcoder with limited drifting error is disclosed. The transcoder accumulates re-quantization errors of I-frames or P-frames. The accumulated errors are only selectively introduced into the transcoding loop in every block to compensate for transcoding errors. A threshold algorithm adaptively utilizes the accumulated errors at block level to control drifting error at an acceptable limited level. Transcoder complexity is scalable because a DCT transform may be removed from the transcoder loop when the accumulated errors are not used for compensation. The re-quantization process can be simply implemented by look-up table(s), which significantly reduces the complexity of the re-quantization process.

34 Claims, 10 Drawing Sheets

Fig. 2 - Prior Art

Exemplary intra block quantization matrix

Exemplary inter block quantization matrix

SCALABLE VIDEO TRANSCODING

TECHNICAL FIELD

The described subject matter relates to video data encoding. More particularly, the subject matter relates to video transcoders for adjusting the bit rate of encoded video data.

BACKGROUND

Efficient and reliable delivery of video data is becoming increasingly important as the Internet continues to grow in popularity. Video is very appealing because it offers a much richer user experience than static images and text. It is more interesting, for example, to watch a video clip of a winning touchdown or a Presidential speech than it is to read about the event in stark print. Unfortunately, video data can require significantly more memory, processor usage, and bandwidth than other data types commonly delivered over the Internet. As an example, one second of uncompressed video data may consume one or more Megabytes of data. Delivering such large amounts of data over error-prone networks, such as the Internet and wireless networks, presents difficult challenges in terms of efficiency, reliability, and network capacity.

After video is encoded according to a video coding format, the encoded video may be transmitted to a client that employs a decoder to decode and present the video. A decoder can decode the sequence of frames by performing operations that are substantially the inverse of the encoding operations. Prior to video transmission, it may be desirable to reduce the bit rate of the encoded video depending on various conditions, such as available network bandwidth, channel capacity, CPU utilization, and client buffer state. By reducing the bit rate in response to changes in such conditions, the encoder can facilitate higher transmission performance and/or higher quality video presentation at the client.

One approach to reducing the bit rate at the encoder is to employ a cascaded decoder-encoder. FIG. 2 illustrates the cascaded approach. As shown, a decoder 202 is placed prior to an encoder 204, whereby the decoder fully decodes video input 206 prior to the encoder 204 re-encoding the video at the desired bit rate. While the cascaded approach may achieve the desired bit rate adjustment without reduction of video quality or drift error, the complexity of the system (e.g., a full decoder) is a serious drawback.

SUMMARY

Implementations of systems, methods, data structures, and computer program products described herein address the above, and other, problems and drawbacks by providing a scalable video transcoder that encodes video data frames at a desired bit rate. The transcoder maintains the underlying format of the input video, but merely changes the bit rate of the output video. The video transcoder can be scaled in complexity to achieve associated encoding goals including bit rate adjustment by selectively accumulating drift error, selectively compensating with drift error, skipping selected frames, and/or entering/exiting open-loop mode.

An implementation of a method for transcoding input video data includes accumulating transcoding error associated with transcoding the input video into output video data encoded at a target bit rate, motion-compensating the accumulated transcoding error, error-compensating the input video data with motion-compensated accumulated transcoding error, and selectively disabling one or more of the accumulating and error-compensating operations based on one or more conditions related to transcoding the input video data.

An exemplary system for transcoding input video data includes an accumulating module accumulating transcoding error associated with transcoding the input video into the output video data, a motion compensation module compensating the accumulated transcoding error with motion estimation data, an error-compensating module compensating the input video data with motion-compensated accumulated transcoding error, a re-quantization module controlling a re-quantization level to achieve the target bit rate, and a compensation switching module operable to disable the error-compensating module in response to the motion-compensated accumulated transcoding error being less than a threshold value.

Another implementation of a system for transcoding video data includes input video data encoded at an initial bit rate and means for transcoding the input video data to generate corresponding output video data encoded at a target bit rate, wherein the means for transcoding includes a re-quantization module having a look-up table including a plurality of dynamically selectable quantization parameters corresponding to associated bit rates.

An implementation of a computer-readable medium includes computer-executable instructions for performing a method including accumulating transcoding error associated with transcoding input video having an associated initial bit rate into output video data having an associated target bit rate, motion-compensating accumulated transcoding error, error-compensating the input video data with motion-compensated accumulated transcoding error, and selectively disabling one or more of the accumulating and the error-compensating operations in response to detecting one or more conditions related to transcoding the input video data.

DETAILED DESCRIPTION

This disclosure describes a video transcoder and associated operations that may be used in motion-compensation-based video coding systems to adjust the encoding of video data based on one or more system conditions or to achieve selected encoding objectives. The transcoder is described in the context of delivering video data over a network, such as the Internet or a wireless network. However, the transcoder and associated operations have general applicability to a wide variety of environments.

Various data transmission conditions, such as bandwidth fluctuation, CPU utilization, and client buffer state, can cause major problems encountered in transmitting video data over the Internet or wireless channels. Adjusting the bit rate of transmitted data to adapt to such conditions without imposing substantial complexity on the encoder can also pose a challenge. The video transcoding scheme described below can facilitate adjustment of video bit rate in response to changes in these conditions with a scalable transcoder, while providing high coding efficiency and performance.

Figure 1:
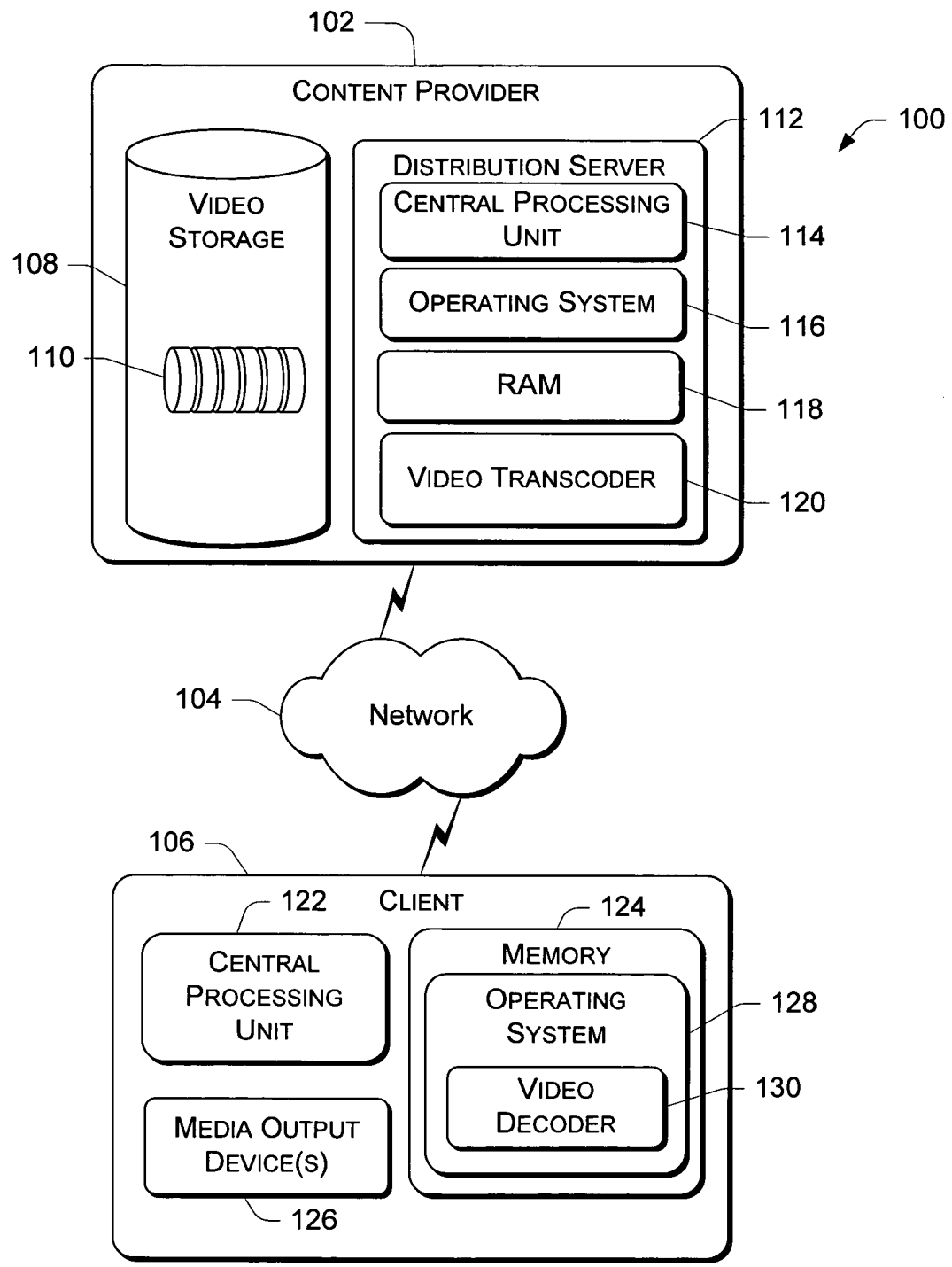
FIG. 1 is a block diagram of a video distribution system in which a content producer/provider transcodes video data and transfers the transcoded video data over a network to a client.

Exemplary System Architecture FIG. 1 shows a video distribution system 100 in which a content producer/provider 102 produces and/or distributes video over a network 104 to a client 106. The network 104 may represent of many different types of networks, including the Internet, a LAN (local area network), a WAN (wide area network), a SAN (storage area network), and wireless networks (e.g., satellite, cellular, RF, etc.).

The content producer/provider 102 may be implemented in many ways, including as one or more server computers configured to store, process, and/or distribute video data. The content producer/provider 102 has a video storage 108 to store digital video files 110 and a distribution server 112 to encode and/or transcode the video data and distribute it over the network 104. The video data files 110 are stored in an encoded format, such as the Motion Picture Experts Group-2 (MPEG-2) format.

To assist in illustrating various concepts discussed herein, the MPEG-2 format is briefly described. MPEG-2 video is composed of groups of pictures (GOPs). Each GOP includes a sequence of three types of video frames: intra coded frames (I-frames), predicted frames (P-frames), and bidirectional frames (B-frames). I-frames use discrete cosine transform (DCT) encoding to compress a single frame without reference to any other frame in the sequence. P-frames are encoded as differences from the last I or P-frame and use motion prediction to predict values of each new pixel. B-frames are encoded as differences from the last and/or next I or P frame, and also employ motion prediction.

An MPEG-2 frame is composed of macroblocks. A macroblock is a fundamental unit of motion compensation. Each macroblock consists of a 16×16 array of pixels and has associated motion vector(s). A motion vector represents the horizontal and vertical displacement from the macroblock being encoded to the matching macroblock-sized area in the reference picture. MPEG-2 is therefore referred to as a motion-compensation-based video coding scheme. Other motion-compensation-based video coding formats include MPEG-1, MPEG-4, H.261, H.263 and H.264.

With regard to providing MPEG-2 video data, the distribution server 112 employs a central processing unit (CPU) 114, an operating system 116 (e.g., Windows NT, Unix, etc.), random access memory (RAM) 118, and a video transcoder 120. The distribution server 112 responds to requests for video data 110, or portions thereof, by transcoding and transmitting the requested video data 110 over the network. Typically, the video data 110 is transcoded and transmitted on a frame-by-frame basis.

The video transcoder 120 encodes the video data 110 according to the video data 110 format at a selected, or target, bit rate prior to transmitting video data over the network 104. The target bit rate may differ from the bit rate of the original video data 110. The target bit rate may be set in response to one or more video transmission conditions, such as, but not limited to, network 104 bandwidth, channel capacity on the network 104, and CPU 114 utilization.

Thus, the transcoder 120 performs a selected video format-to-selected video format transcoding of the video data 110 wherein the bit rate may be changed during transcoding. In an implementation using MPEG-2 format video data 110, the transcoder 120 receives MPEG-2 video data 110 at an original bit rate and generates MPEG-2 video data at a target bit rate. Other video formats, such as, but not limited to, MPEG-4, H.261, H.263, H.264, and 'WMV' (WINDOWS Media Format) may be applied to the transcoder 120 and transmitted at an adjusted bit rate.

In addition to encoding video data at a target bit rate, the transcoder 120 may drop (i.e., not transmit) certain selected portions of the video data 110. For example, the video transcoder 120 may not transmit B-frames if the CPU 114 utilization is too high. By dropping a portion of the video data 110, the quality of the video at the client 106 may be reduced slightly, but this may be more desirable than the consequences of failing entirely to encode the video data 110 rapidly enough.

To facilitate adaptation to transmission conditions, the transcoder 120 may be scalable in complexity. For example, various portions of the encoding process of the transcoder 120 may be dynamically included in and/or excluded from the transcoder 120 to achieve desired encoding goals.

The video transcoder 120 may be implemented in software, firmware, and/or hardware. The transcoder 120 is shown as a separate standalone module for discussion purposes, but may be constructed as part of the CPU 114 or incorporated into operating system 116 or other applications (not shown). Various exemplary implementations of the transcoder 120 and associated processes and operations are illustrated and described in further detail below with regard to FIGS. 3-10.

The client 106 is equipped with a CPU 128, a memory 130, and one or more media output devices 132. The memory 130 stores an operating system 134 (e.g., a WINDOWS-brand operating system) that executes on the CPU 128. The operating system 134 implements a client-side video decoder 136 to decode the layered video streams into the original video. In the event data is lost, the decoder 136 is capable of reconstructing the missing portions of the video from frames that are successfully transferred. Following decoding of each video frame, the client 106 plays the video frame via the media output devices 132. The client 106 may be embodied in many different ways, including a computer, a handheld entertainment device, a set-top box, a television, and so forth.

Exemplary Systems for Encoding Video Data at a Target Bit Rate

Figure 2:
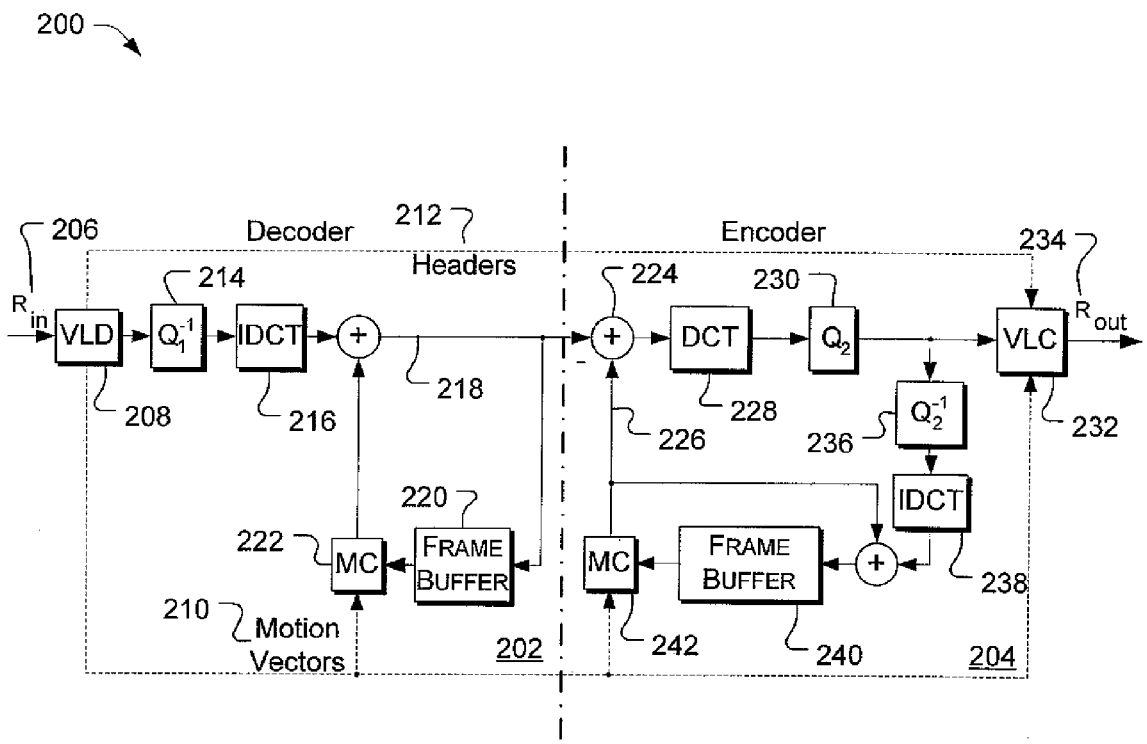
FIG. 2 is a block diagram of a cascaded decoder/encoder arrangement that can transcode input video data at a selected bit rate.

FIG. 2 is a block diagram of a cascaded decoder/encoder arrangement 200 that can transcode MPEG-2 input video data at a selected bit rate. The cascaded decoder/encoder 200 includes a video decoder 202 and a video encoder 204. The decoder 202 receives MPEG-2 input video data 206 encoded according to the MPEG-2 video format at an initial bit rate, and fully decodes the input video data 206.

Decoding the input video data 206 involves first applying a variable length decoder (VLD) 208. The VLD 208 extracts certain information from the input MPEG-2 video including motion vectors 210 (shown in dotted lines) and headers 212 (shown in dotted lines). The VLD 208 outputs decoded video coefficients to a dequantization module (or inverse quantizer) 214.

The dequantization module 214 dequantizes the decoded coefficients by applying a dequantization function, $Q_1^{-1}$, which uses a quantization parameter, $q_1$, that corresponds to the initial bit rate of the input video data 206. The dequantization module 214 multiplies video data coefficients by corresponding values in a quantization matrix and a quantization scale factor. The dequantized video data is then input into an inverse discrete cosine transform (IDCT) module 216, which decompresses the video data according to an IDCT algorithm. Any methods of variable length decoding, video dequantizing and decompressing as may be known in the art can be applied by the VLC 208, the dequantization module 214 and IDCT module 216, respectively.

The output of the IDCT module 216 is combined with motion compensated video from a previously decoded macroblock or frame. The combination of the IDCT module 216 and the motion compensated video are the decoded video data 218 that are output from the decoder 202. The decoded video data 218 are fed back into a frame buffer 220, which stores the decoded video data 218. The frame buffer 220 outputs the decoded video data 218 to a motion compensation module 222. The motion compensation module 222 uses the motion vectors 210 and the decoded video data 218 to generate motion compensated macroblocks for the following frame.

The decoded video data 218 is input into the encoder 204. The encoder 204 fully re-encodes the decoded video data 218 by recompressing, re-quantizing, and variable length coding the decoded video data 218. As shown, the encoder 204 includes a difference module 224 that outputs the difference between the decoded video data 218 and motion compensated transcoded video data 226.

The output of the difference module 224 is input into a discrete cosine transform (DCT) module 228, which compresses the data using a DCT algorithm. The DCT module 228 outputs DCT coefficients to a quantization module 230 that quantizes the DCT coefficients with a quantization function, $Q_2$, which applies a target quantization parameter, $q_2$, that corresponds to the target bit rate. Quantization refers to assigning a number of bits to represent a unit of video data, such as a pixel, DCT coefficient, or video frame. More quantization levels available for assigning video values typically corresponds to higher bit rates. The quantization module 230 outputs quantized DCT coefficients at the desired quantization levels to a variable length coder (VLC) 232. The VLC 232 performs a variable length coding algorithm on the re-quantized data to generate transcoded output video 234 at a desired bit rate.

The quantized DCT coefficients from the quantization module 230 are also dequantized by dequantization module 236. The dequantization module 236 applies an inverse quantization function, $Q_2^{-1}$, using the target quantization parameter, $q_2$, to generate dequantized DCT coefficients. The dequantized DCT coefficients are input to an IDCT module 238 that performs an inverse DCT on the dequantized DCT coefficients. The output of the IDCT 238 is combined with the motion compensated transcoded video data 226 and then stored in a frame buffer 240. The output of the frame buffer 240 is input to a motion compensator module 242, which uses the motion vectors 210 to generate the motion compensated transcoded video data 226.

Although the cascaded decoder/encoder approach described in FIG. 2 yields acceptable transcoding results with little or no drift error, the cascaded arrangement 200 is highly complex. In addition, the cascaded arrangement 200 is highly CPU intensive, requiring continuous feedback, dequantizing, decompressing, and motion estimation. If the CPU is relatively low-speed, or low-power, the CPU may not be able to maintain the required rate of transcoding.

Figure 3:
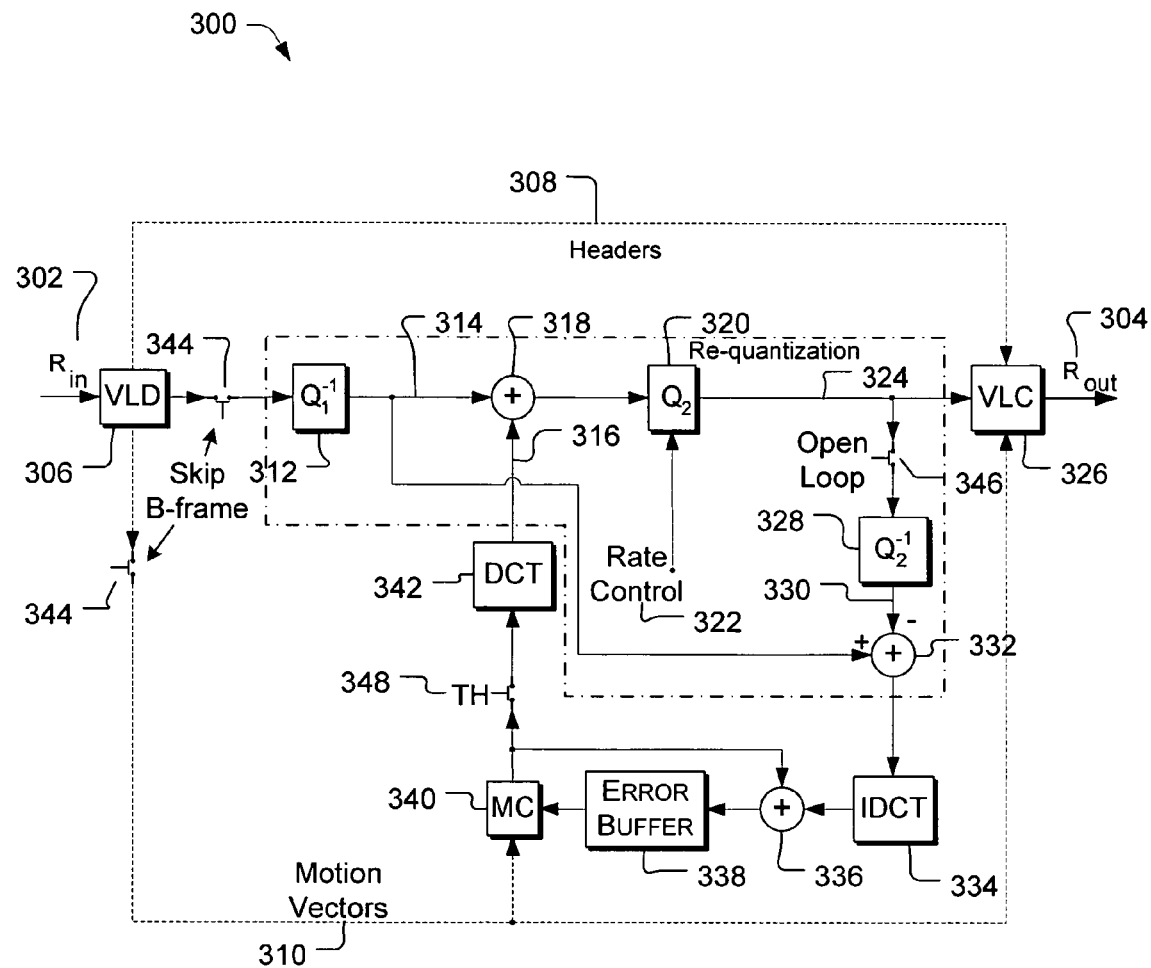
FIG. 3 is a block diagram of an exemplary video transcoder that can be used for encoding input video data at a target bit rate.
Figure 4:
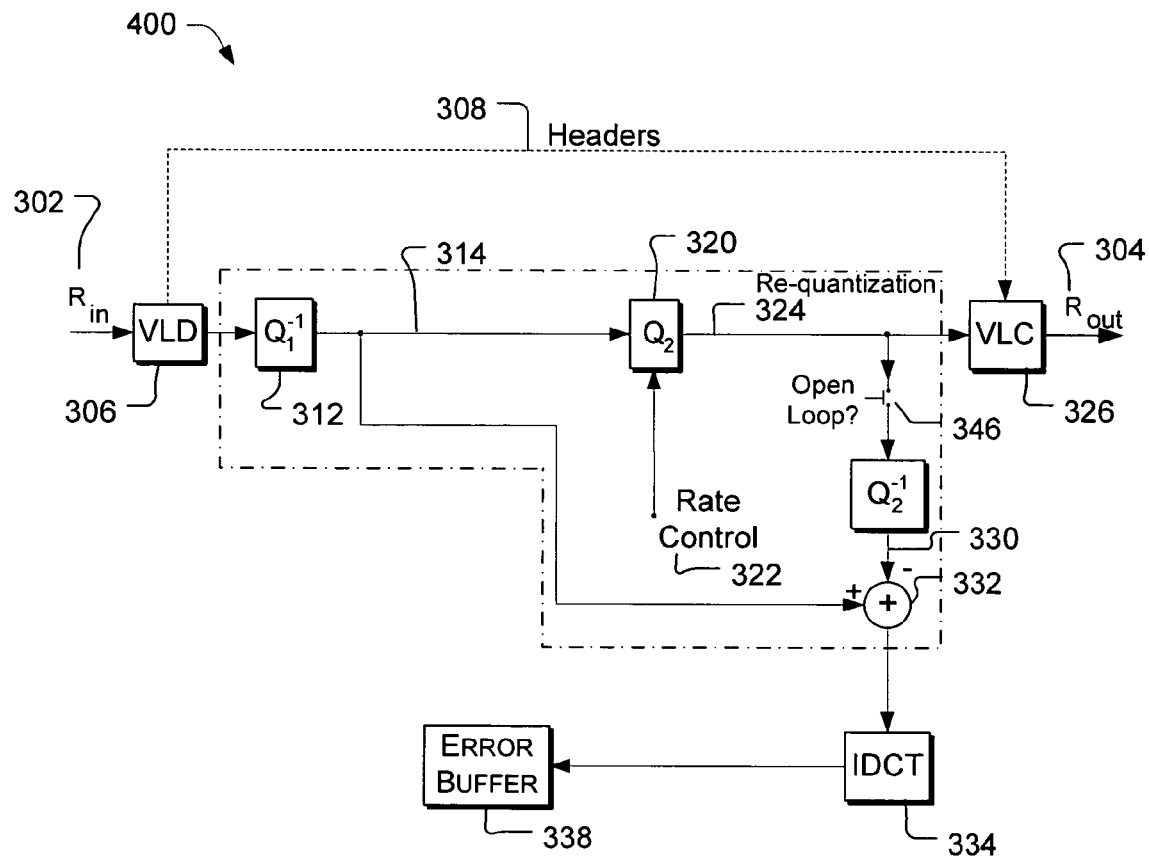
FIG. 4 is a block diagram of another exemplary video transcoder that can be used for encoding I-frames of input video data at a target bit rate.
Figure 5:
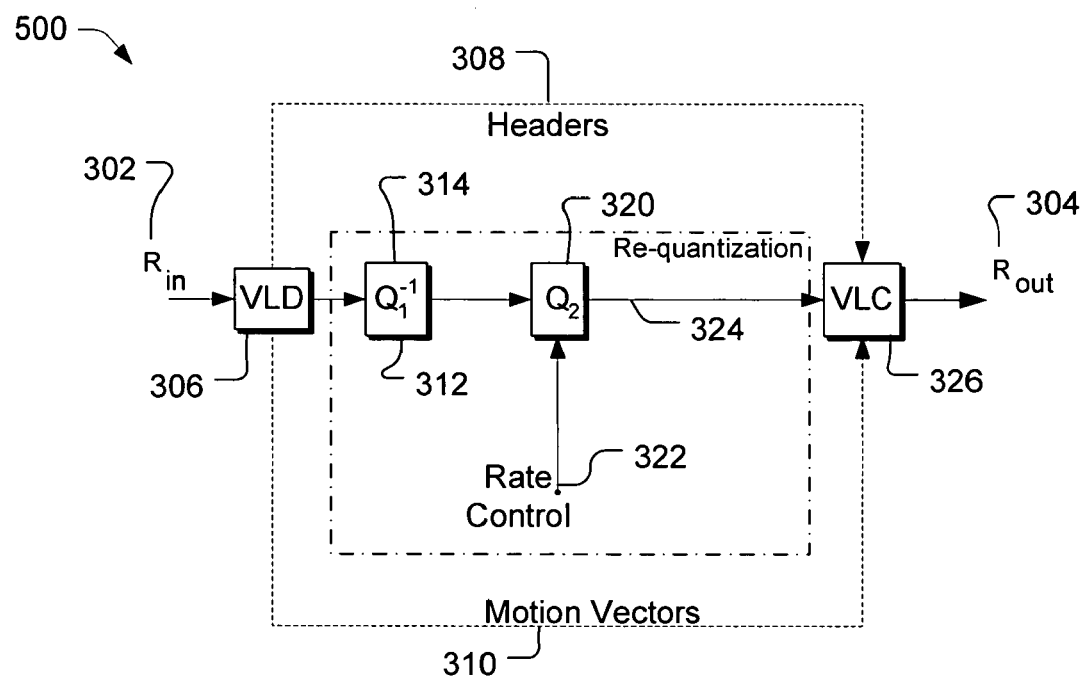
FIG. 5 is a block diagram of another exemplary video transcoder that can be used for encoding B-frames of input video data at a target bit rate.

FIGS. 3-5 illustrate exemplary alternatives to the highly complex cascaded arrangement 200. The exemplary alternatives shown in FIGS. 3-5 can facilitate fast, high-quality, adaptable transcoding with limited or no drift error, while adjusting to system conditions, such as CPU utilization.

FIG. 3 is a block diagram of an exemplary video transcoder 300 that can be used for transcoding input video data 302 into output video data 304 at a target bit rate. As discussed, the transcoder 300 is typically implemented on server computer, or other type of suitable computing device. The input video data 302 is assumed to be encoded at an initial bit rate which is easily determined by the transcoder 300 or an application running on the server.

The output video data 304 is also referred to as transcoded video data 304. The transcoded video data 304 does not differ from the input video data 302 in terms of video encoding format. Thus, for example, if the input video data 302 is MPEG-2 video, the transcoded video data 304 will be represented in the MPEG-2 format. The transcoded video data 304 may differ from the input video data 302 in terms of bit rate. The transcoded video data 304 may also differ from the input video data 302 in terms of frame composition. As discussed in further detail below, the transcoder 300 may selectively skip, or drop, certain frames.

A visual comparison of FIG. 2 and FIG. 3 shows that FIG. 3 includes modules that are analogous to some of the modules in FIG. 2, but that FIG. 3 is substantially scaled down from the cascaded transcoder of FIG. 2. For example, although the transcoder 300 includes a variable coder and decoder as in the cascaded arrangement, the transcoder 300 does not include an IDCT module analogous to the IDCT module 216 or a DCT module analogous to the DCT module 228.

One reason the transcoder 300 of FIG. 3 can be so greatly simplified from that of FIG. 2 is that the transcoder of FIG. 3 only transcodes the bit rate and/or selectively skips video frames from those of the input video data 304, rather than changing the actual format or spatial resolution of the input video data 304, which are characteristic of some traditional transcoders. The reduction in complexity offered by the transcoder 300 can be beneficial in some situations. In addition, the transcoder 300 includes switching modules (described below) that provide for complexity scalability.

With specific regard to the transcoder 300, a variable length decoder (VLD) 306 receives the input video data 302 and applies variable length decoding to the input data. The variable length decoder 306 extracts header information 308 (shown with dotted lines) and motion vector information 310 (shown with dotted lines) from the input video data 302. The header information 308 and the motion vector information 310 are fed forward in the transcoder 300 for use by other processes/devices in the transcoder 300.

The output of the VLD 306 is input to a dequantization module 312, which dequantizes the video data according to a dequantization function, $Q_1^{-1}$. The dequantization function, $Q_1^{-1}$, applies quantization parameter $q_1$, which corresponds to an initial bit rate of the input video data 302. As discussed, the initial bit rate of the input video data 302 is readily available by the transcoder 300. The output of the dequantization module 312 includes dequantized compression coefficients 314 (e.g., DCT coefficients) representative of the input video data 302.

As is discussed in further detail below, the dequantized compression coefficients 314 are fed forward and used to determine transcoding error information later in the transcoding process. The dequantized compression coefficients 314 are also summed with transcoding error compensation data 316 at an error compensation module 318. The error compensation module 318 outputs dequantized compression coefficients that have been adjusted or compensated with the transcoding error compensation data 316. The transcoding error compensation data 316 is also referred to herein as drift error, accumulated drift error, accumulated transcoding error, or accumulated error. The manner of generating the transcoding error compensation 316 is discussed further below.

The output of the error compensation module 318 is input into a quantization module 320, which quantizes the error compensated video data according to a quantization function, $Q_2$. The quantization function, $Q_2$, quantizes the error compensated video data based on a target quantization parameter, $q_2$, which corresponds to a target bit rate. A rate control input 322 to the quantization module 320 controls the quantization parameter, $q_2$, to achieve the target bit rate. The rate control input 322 is discussed in further detail with regard to FIG. 8. The output of the quantization module 320 is re-quantized video data 324 at the target bit rate.

The re-quantized video data 324 is also referred to as 'transrated' video data 324. The term 'transrated' means that the video data that is output by the quantization module 320 may have a different bit rate than the initial bit rate of the input video data 302. Typically the bit rate of the transrated video data 324 is lower than the initial bit rate in order to adapt to certain system conditions, such as lower network bandwidth or channel capacity.

The transrated video data 324 is input to a variable length coder (VLC) 326, which variable length encodes the transrated video data 324. The output of the VLC 326 is the transcoded video data 304. The transrated video data 324 is input to another dequantization module 328, which dequantizes the transrated video data 324 using a dequantization function, $Q_2^{-1}$. The dequantization function, $Q_2^{-1}$, applies the inverse of the quantization module 320. Thus, the dequantization function, $Q_2^{-1}$, dequantizes the transrated video data 324 using the target quantization (i.e., dequantization) parameter, $q_2$.

The output of the dequantization module 328 is dequantized transrated video data 330. The dequantized transrated video data 330 is input into an error determination module 332. The error determination module 332 subtracts the dequantized transrated video data 330 from the initial dequantized compression coefficients 314. The output of the error determination module 332 represents transcoder error or drift error.

An inverse discrete cosine transform (IDCT) module 334 performs an IDCT function on the transcoder error data from the error determination module 332. The IDCT module 334 converts the transcoder error data from the frequency domain to the pixel domain. Thus, the output of the IDCT module 334 represents transcoder error data in the pixel domain. The pixel domain transcoder error data is summed with motion compensated error data by an accumulator 336.

The output of the accumulator 336 is stored in an error buffer 338. The error buffer 338 includes accumulated transcoder error or accumulated drift error. A motion compensator 340 applies the motion vectors 310 to the accumulated transcoder error from the error buffer 338. The motion compensated data from the motion compensator 340 is fed back into the accumulator 336. The motion compensated data is also input into a discrete cosine transform (DCT) module 342.

The DCT module 342 applies a DCT function to the motion compensated error data. The DCT module 342 converts the pixel domain error data back into the frequency domain. The output of the DCT module is the transcoding error compensation data 316 referred to above. As discussed above, the transcoding error compensation data 316 is added to the initial dequantized compression coefficients 314 by the summer 318. The summer 318 performs an important task of adjusting the input dequantized video data by the accumulated drift error in order to reduce or eliminate error due to drift that may arise during the transcoding process.

Figure 6:
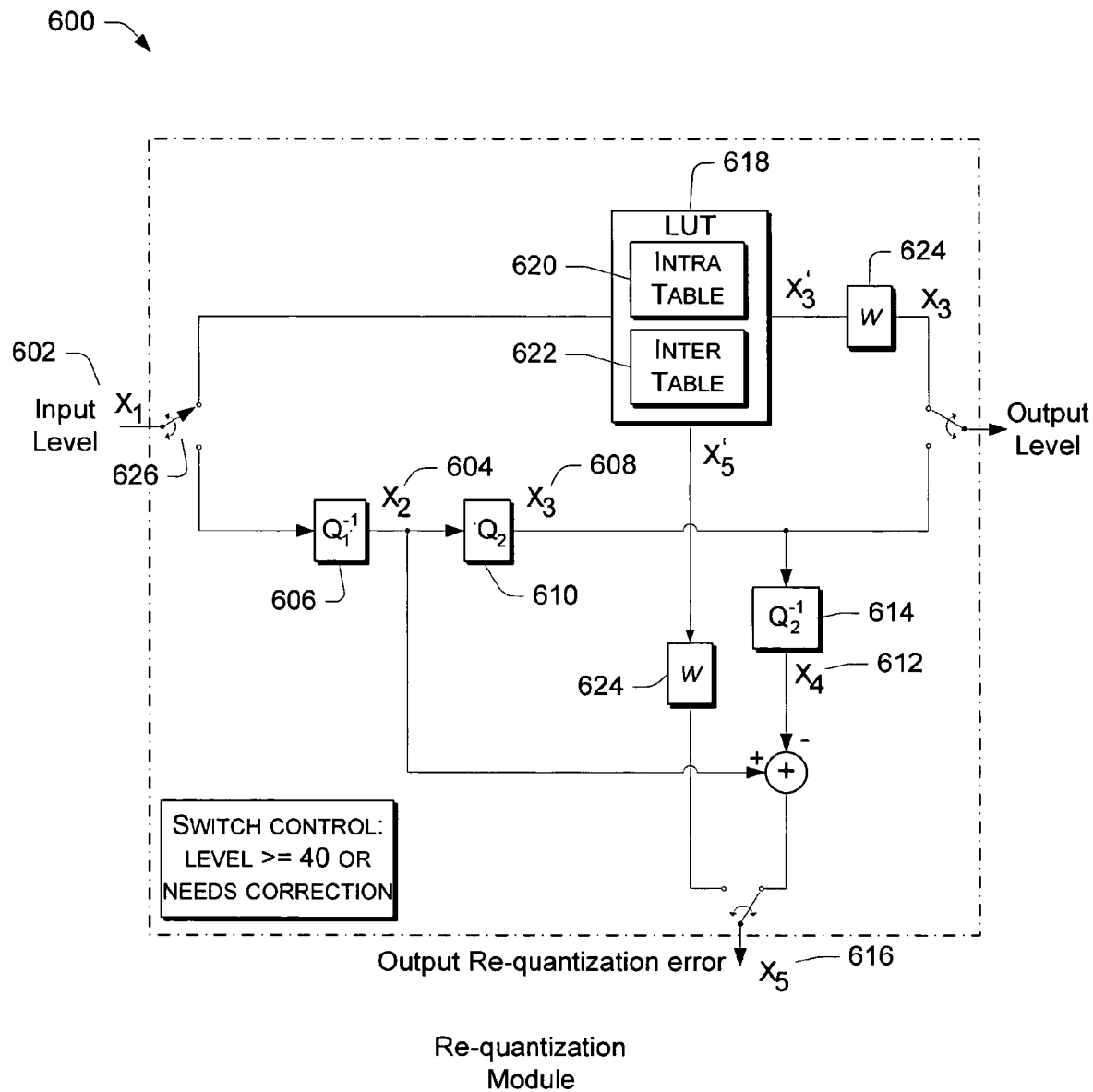
FIG. 6 is a block diagram of an exemplary re-quantization module that employs a look-up table for rapid re-quantization of input video data.

The dequantization module 312, the quantization module 320, the dequantization module 328, and the error determination module 332, may collectively be referred to as a re-quantization module. An exemplary re-quantization module is illustrated in FIG. 6 and discussed in further detail below. Because the processes of dequantizing and quantizing can be computationally demanding, the exemplary re-quantization module in FIG. 6 includes a useful look-up table (LUT) that can save processor time.

As discussed above, the transcoder 300 includes one or more switching modules or components that provide for complexity scalability of the transcoder 300. The switching modules provide for system condition adaptability and video frame-type adaptability. Exemplary switching components are described in detail below.

One implementation of the transcoder 300 includes skip B-frame switch(es) 344, an accumulate error switch 346, and a compensate switch 348. The switches 344, 346 and 348 provide for selective addition and/or removal of certain portions or loops in the transcoder 300. During operation, when system conditions change, it may be beneficial to disable and/or enable one or more of the portions of the transcoder to achieve desired system objectives using the switches, thereby disabling and/or enabling one or more of the error-compensating and error accumulating operations in the transcoding process.

With more specific regard to the compensate switch 348, the compensate switch 348 controls whether the dequantized input video data 314 will be compensated with the accumulated transcoding (or drift) error 316. The notation 'TH' represents a threshold value (e.g., $Q_2/2$). If the accumulated drift error 316 is more than the threshold, the compensate switch 348 is closed and the accumulated drift error 316 is combined with the dequantized input video data 314 at the summer module 318; otherwise, error-compensation will not occur and the input video data 302 will simply go through a re-quantization process.

A particular implementation of the compensate switch involves a triple-threshold algorithm to control whether or not to update an 8×8 block in a frame with the accumulated errors. In this implementation, the threshold of each 8×8 block is dynamically selected along with the counter of a block that is not updated.

In the triple-threshold algorithm, an error metric, s, can be calculated that represents the accumulated error of pixels in a video block. In a particular implementation of the triple-threshold algorithm, the error metric is a sum of absolute error of the accumulated error of each 8×8 block as shown in equation (1):

$$s = \sum_{i=0}^{7} \sum_{j=0}^{7} |e(i, j)| \qquad (1)$$

where e(i, j) represents the accumulated error of each pixel in a block. In other implementations, the error metric can include other functions of the error, such as, but not limited to, the mean square error.

To further illustrate the triple-threshold approach, assume there are three thresholds: TH1, TH2, and TH3, where TH1>TH2>TH3. The larger the threshold, the less likelihood an 8×8 block will be compensated with the accumulated error.

In order to achieve a better trade-off between transcoding complexity and picture quality, the selection of the threshold is described with pseudo-code shown below, where every block has a unique counter variable block_counter. The larger block_counter, the less the selected threshold, then the more likelihood that blocks are compensated with the accumulated error. The parameter block_counter is set to zero when the block is an intra block (i.e., an 8×8 block coded without any prediction from other frames).

```
switch (block_counter)
{
    case 0:     TH = TH1; break;
    case 1:     TH = TH2; break;
    default:    TH = TH3; break;
}
for (i = 0;i <= 7;i++){
    for (j = 0;j <= 7;i++){
        s += abs(e(i,j));
    }
}
if (Intra block)
    block_counter = 0;
else if (Inter block in P picture)
{
    if (s > TH)
    {
        //drifting error compensation;
        if (block_counter > 0)
            block_counter = block_counter – 1;
    }
    else
    {
        //no drifting error compensation;
        block_counter = block_counter + 1;
    }
}
```

When block_counter is 0, i.e., drifting error propagated from previous frames is zero or very small, the high threshold TH1 is selected. When block_counter is 1, the intermediate threshold TH2 is selected; otherwise the lower threshold TH3 is selected. If an inter block (i.e., an 8×8 block that is coded with prediction from another frame) in a P-frame is compensated with the accumulated errors and its block_counter is more than 0, block_counter decreases 1. If an inter block in a P-frame is not compensated with the accumulated errors, block_counter increases 1.

It will be appreciated that if the compensate switch 348 is opened, the transcoder 300 and the transcoding process is greatly simplified over the cascaded 11 transcoder 200 shown in FIG. 2. For example, when the compensate switch 348 is open, the DCT module 342 and summer module 318 can be removed. By opening the compensate switch 348, the quality of video may be reduced because drift error is not being added back into the video data; however, if the CPU does not have enough cycles to perform the transcoding with drift error compensation, opening the compensate switch 348 may ensure that the video data continues to be transcoded, albeit at a slightly lower quality.

With regard to the skip B-frame switch(es) 344, the skip B-frame switch(es) 344 applies only to B-frames. In one implementation, if the TH value is set to a very high value and the server still is unable to handle real-time transcoding, the skip B-frame switch 344 will be opened. When the skip B-frame switch(es) are open, any B-frames in the input video data 302 will not be transcoded or transmitted. In one implementation, instead of transmitting a transcoded B-frame, the transcoder 300 will add some header information that notifies the decoder that the B-frame has been skipped. The VLD 306 can determine whether a frame is a B-frame and insert the information into the headers 308.

If the accumulate error switch 346 is opened, the transcoder 300 is an open-loop system. Thus, the accumulate error switch 346 can be opened to prevent accumulation and compensation of drift error, and thereby reduce required processing time during the transcoding process. In some extreme cases where the server still doesn't have enough cycles (even with switches 344 and 348 opened) for the transcoding process, the accumulate error switch 346 can be opened. When the accumulate error switch 346 is opened the drifting error for the current group of pictures (GOP) will not be accumulated. The transcoding process runs in open-loop mode where the entire motion compensation loop is eliminated. In the open-loop mode, the skip B-frame switch 344 can still be turned on to save extra computational cycles.

In one implementation, the skip B-frame switch(es) 344, the accumulate error switch 346, and the compensate switch 348 are all closed when P-frames from the input video data 302 are being transcoded. In this implementation, the accumulated drift error 316 will continue to be accumulated and used to compensate for drift due to transcoding.

It is to be understood that the term 'switch' as used herein is intended in the broadest meaning of the term. The term 'switch' is not to be limited to well-known mechanical or electromechanical switches. On the contrary, because the transcoder 300 can be readily implemented in any combination of hardware, software, or firmware, the term 'switch' includes any type of hardware switch, software switch, or firmware switch that causes an output state corresponding to an associated input condition.

By way of example, and not limitation, the switches described herein may be implemented with a software instruction, such as an 'if-then' statement, or a 'switch' statement, in the well-known 'C' programming language. As another example, any of the switches described herein may be implemented with a solid state device, such as a transistor, which allows for selection among multiple states in response to an input state. As yet another example, switches may be implemented with programmable memory devices, such as Programmable Read Only Memory (PROM). Those skilled in the art will recognize numerous other implementations of switches described herein that fall within the scope of the claims recited below.

FIG. 4 is a block diagram of another exemplary video transcoder 400 that can be used for encoding I-frames of input video data 302 encoded at an initial bit rate into I-frames of transcoded video data 304 encoded at a target bit rate. Not all modules included in the transcoder 300 (FIG. 3) are necessary for I and B frames. FIG. 4 depicts a transcoder 400 for transrating the input video data 302 for I-frames. Below, FIG. 5 illustrates a variation of the transcoder 300 (FIG. 3) that can be used for transrating B-frames.

The transcoder 400 can be easily obtained using the transcoder 300 (FIG. 3) by opening the compensate switch 348 of transcoder 300. Since both I-frames and P-frames are used by the decoder at the client as references for other frames, it is necessary to update the error buffer 338 in FIG. 4 with the accumulated drift errors. However, because I-frames are coded without any prediction from other frames, no drift error compensation is needed for the I-frames. Thus, as shown in FIG. 4, the accumulate error switch 346 is closed, thereby causing the transcoder 400 to accumulate drift error in the error buffer 338; however, the compensate switch 348 (FIG. 3) is opened, thereby avoiding the additional complexity associated with compensating for drift error.

The reader will appreciate that the transcoder 400 is a scaled version of the transcoder 300 by virtue of the compensate switch 348. The complexity of the transcoder 300 can be dynamically scaled in response to detected system conditions to achieve numerous desired coding objectives. FIG. 5 illustrates how a user may even further scale down the complexity of the transcoder 300, and yet still provide for adjustment of bit rate in response to system conditions.

Without an error accumulation and compensation feedback loop (i.e., in open-loop mode), adjusting the bit rate of the encoded data can result in reduction of video quality due to drifting error. For example, a simple open-loop approach is to re-quantize DCT coefficients in the original video bit stream to achieve a desired lower bit rate without consideration of the P-frames; however, any changes in the P-frame not only would result in errors in the associated decoded frame but also would cause errors in subsequent frames, and may even accumulate into larger and larger errors in later frames. Such an accumulation of errors is often referred to as a "drift error" problem, which has been discussed herein.

In some cases, a limited amount of drift error may be acceptable. For example, when the server CPU is at or near maximum utilization and can not keep up with the necessary speed of transcoding, error accumulation and/or compensation may impose too great of a burden on the CPU and result in a large drop in quality. Allowing for a limited, or acceptable, amount of drift error may be beneficial when transcoding B-frames because B-frames are not used as a reference image during reconstruction. Thus, any drifting error associated with a B-frame is not propagated to other frames. FIG. 5 illustrates such an open-loop re-quantization model.

FIG. 5 is a block diagram of another exemplary video transcoder 500 that can be used for encoding B-frames of input video data 302 encoded at an initial bit rate and generate transcoded video data 304 encoded at a target bit rate. The open-loop transcoder 500 is a greatly scaled down version of the transcoder 300 (FIG. 3). As is known, B-frames don't contribute to drift errors because B-frames are not relied on upon as reference frames by the decoder for prediction. Thus, the transcoder 500 has been scaled down by opening the compensate switch 348 and the accumulate switch 346 of the transcoder 300.

Exemplary Systems for Re-Quantizing Video Data

FIG. 6 is a block diagram of a re-quantization module 600 that employs a look-up table for rapid re-quantization of input video data. In FIG. 6, input level 602 (represented by $X_1$) represents the decoded quantization level that is extracted from the initial video bit stream by variable length decoding (VLD); a DCT coefficient 604 (represented by $X_2$) is obtained by a de-quantization process 606 with the initial quantization parameter $q_1$; the output quantization (i.e., re-quantization) level 608 (represented by $X_3$) is calculated by a second quantization process 610 with a target quantization parameter $q_2$. The above computations are formulated in equations (2) and (3) below:

$$X_2 = Q^{-1}(X_1, q_m, q_1) \quad (2)$$

$$X_3 = Q(X_2, q_m, q_2) \quad (3)$$

Figure 7:
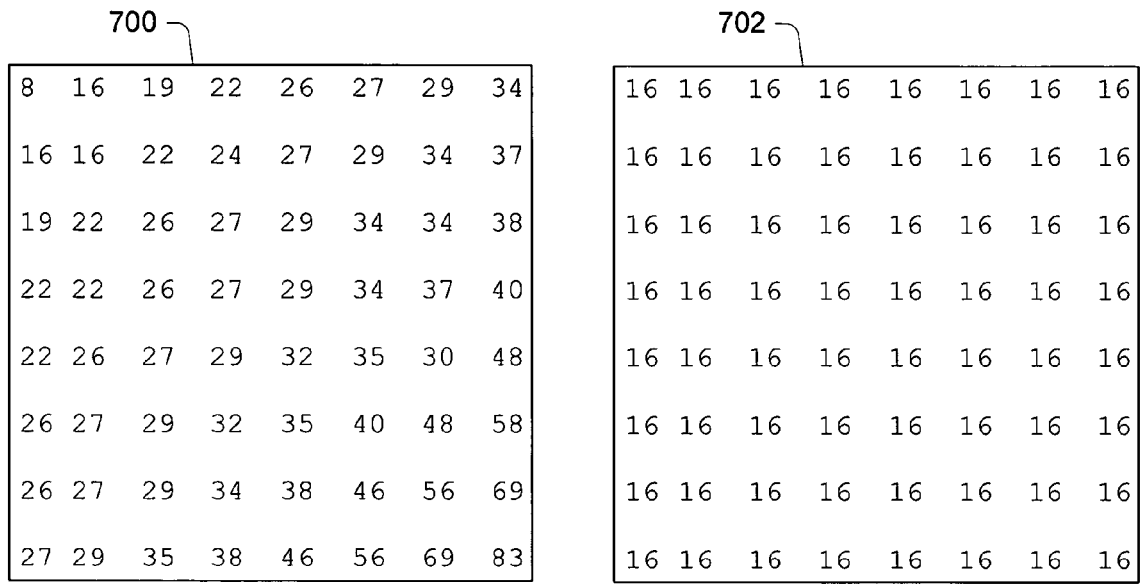
FIG. 7 illustrates an intra-quantization matrix and an inter-quantization matrix that can serve as exemplary implementations of the look-up table of FIG. 6.

$Q(\ )$ is the quantization function, $Q^{-1}(\ )$ is the de-quantization function, and $q_m$ is the corresponding element in the MPEG-2 quantization matrix. An exemplary default intra block quantization matrix 700 and inter block quantization matrix 702 are illustrated in FIG. 7.

Incorporating equation (2) with equation (3), $X_3$ can be calculated with the following equation:

$$X_3 = Q(X_2, q_m, q_2) = Q(Q^{-1}(X_1, q_m, q_1), q_m, q_2) = F_1(X_1, q_m, q_1, q_2) \quad (4)$$

$F_1(\ )$ is the de-quantization and quantization process.

For accumulating the re-quantization error, a second de-quantization DCT coefficient 612 (represented as $X_4$) is determined by a second dequantization module 614 according to equation (5):

$$X_4 = Q^{-1}(X_3, q_m, q_2) \quad (5)$$

Incorporating equations (4) and (5) results in:

$$X_4 = Q^{-1}(F_1(X_1, q_m, q_1, q_2), q_m, q_2) = F_2(X_1, q_m, q_1, q_2) \quad (6)$$

$F_2(\ )$ represents the first de-quantization process 606, the quantization process 610 and second de-quantization process 614. A re-quantization error 616 (represented as $X_5$) is calculated as follows:

$$X_5 = X_2 - X_4 = Q^{-1}(X_1, q_m, q_1) - F_2(X_1, q_m, q_1, q_2) = F_3(X_1, q_m, q_1, q_2) \quad (7)$$

Traditional approaches involve calculating the output quantization level $X_3$ and the re-quantization error $X_5$ during the transcoding or transrating process. It will be appreciated that calculating the values $X_3$ and $X_5$ can be time-consuming and resource-intensive tasks for a processor. In an alternative implementation, the functions $F_1(\ )$ and $F_3(\ )$ can be simply implemented using a look-up table (LUT) 618 to determine $X_3$ and $X_5$. The LUT 618 takes input parameters $X_1, q_m, q_1, q_2$ and outputs scaled versions of $X_3$ and $X_5$. These scaled versions of $X_3$ and $X_5$ are referred to here as $X_3'$ and $X_5'$, respectively.

A particular implementation of the LUT 618 includes an intra re-quantization table 620 to re-quantize intra blocks and an inter re-quantization table 622 to re-quantize inter blocks. Thus, the intra re-quantization table 620 outputs values $X_3$ and $X_5$ that correspond to $X_1$ levels in intra blocks; and the inter re-quantization table 622 outputs values $X_3$ and $X_5$ that correspond to $X_1$ levels in inter blocks.

With regard to FIG. 7, for intra blocks, $q_m$ can be selected from a matrix, such as the exemplary default intra block quantization matrix 700. In the illustration, the default intra block quantization matrix 700 includes a set of values {16, 19, 22, 24, 26, 27, 29, 32, 34, 35, 37, 38, 40, 46, 48, 56, 58, 69, 83}. Thus, $q_m$ can take on one of 19 possible values. Assume that the quantization parameters $q_1$, and $q_2$ each vary from 1 to 31. However, because of bit-rate reduction transcoding, it is reasonable to assume $q_2 \geq q_1$, so there are 31×16 possible combinations of $q_1$, and $q_2$.

In a particular implementation of the re-quantization module 600, the input decoded level $X_1$ is in the range [1, 2047]. Considering all possible combinations of $X_1, q_m, q_1$ and $q_2$, the intra re-quantization table 620 consists of 31×16×19× 2047 elements. Each element has 4 bytes with 2 byte for $X_3$ and 2 bytes for $X_5$. Therefore, the intra re-quantization table 620 would require about 77 M bytes. For inter blocks, the exemplary default inter quantization matrix 702 includes only value of 16, from which $q_m$ is selected. So the inter re-quantization table 622 requires about 4 M bytes.

The sizes of the intra re-quantization table 620 and inter re-quantization table 622 can be reduced significantly. While it is possible that $X_1$ 602 can range from [1, 2047], $X_1$ 602 is frequently located in a certain range, e.g., [1, 40]. When $X_1$ 602 is more than a predetermined switching value, the re-quantization process is not implemented by look-up table 618 so as to reduce the table sizes. The predetermined switching value may be chosen depending on the particular implementation. In one implementation, the predetermined switching value is set to 40.

In MPEG-2, the quantization matrix can be defined by a user and may differ from the default matrices 700 and 702 shown in FIG. 7. In the worst case, $q_m$ may have 64 different values. The table size will be far more than the previous estimation. Considering the general case, when the two matrices are constructed, $q_m$ in equations (4) and (7) is always set to 16. In a particular implementation, the re-quantization value $X_3$ and the error value $X_5$ can be calculated with the parameter, $q_m$, with a multiply and a right shift (i.e., a divide operation) as follows:

$$X_3 = \frac{X_3' \times q_m}{16} \quad (8)$$

$$X_5 = \frac{X_5' \times q_m}{16} \quad (9)$$

$X_3'$ represents the results of $F_1()$ with fixed $q_m$, =16, and $X_5'$ represents the results of $F_3()$ with fixed $q_m$, =16. As discussed above, $X_3'$ and $X_5'$ can be obtained by the look-up table 618. The multiply and shift operations of equations (8) and (9) can be implemented with weighting modules 624. By the above two improvements, the size of intra and inter matrix has been shown to be around 79K bytes. Furthermore, the intra quantization table 620 and the inter quantization table 622 do not need to be recalculated when the quantization matrices 700 and 702 are changed.

Referring again to FIG. 6, the re-quantizer 600 includes a switch 626 that is controlled by input level value 602. In the implementation shown in FIG. 6, when input level 602 is more than 40, the re-quantization is performed without use of the look-up table 618; otherwise the look-up table 618 is used. As discussed above, the input level at which the switch 626 toggles to and from the look-up table 618 path can be adjustable.

Figure 8:
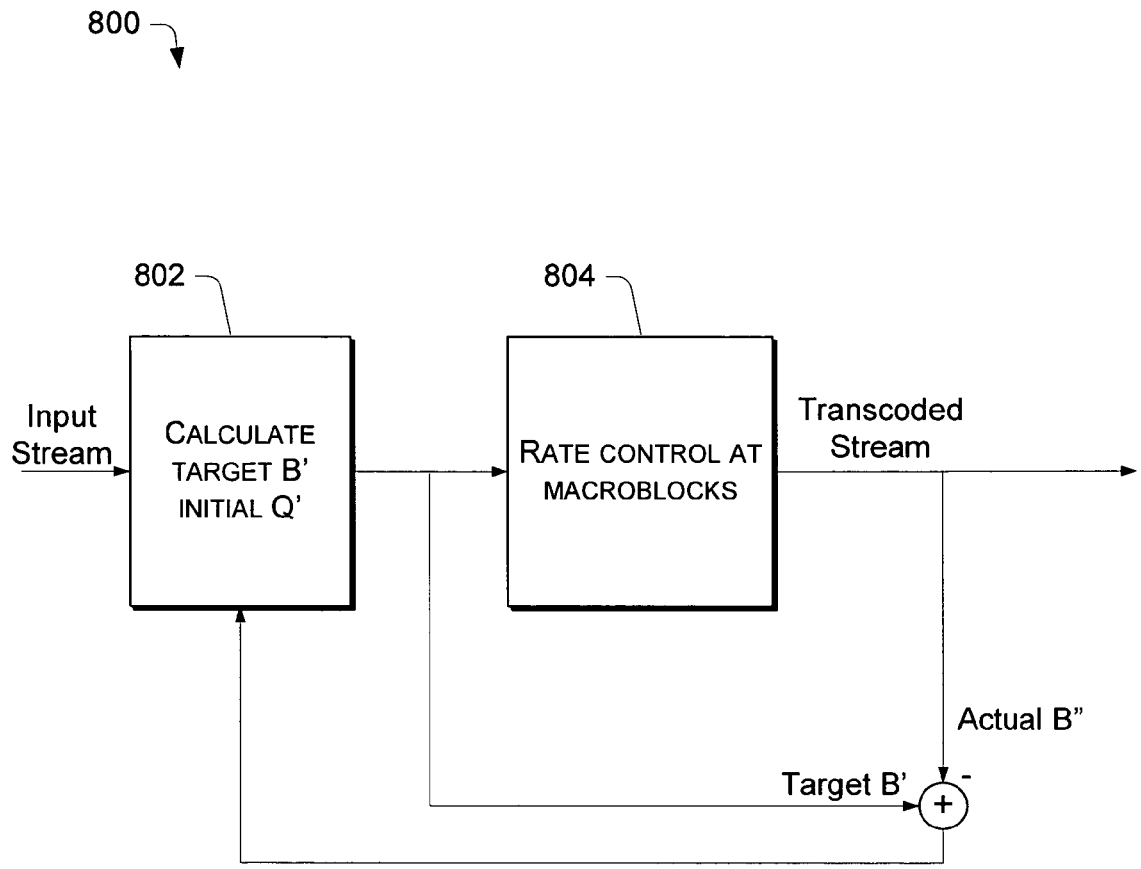
FIG. 8 is a block diagram of a target bit rate controller that may be used to dynamically control quantization levels to achieve a target bit rate of transcoded video data.

FIG. 8 is a block diagram of a target bit rate controller which may be used to dynamically control a quantization parameter corresponding to the target bit rate of transcoded video data. In order to support more accurate transcoding rate and modify the transcoding rate on the fly, a new rate control scheme is proposed in FIG. 8, where rate information and quantization parameters in input MPEG-2 bit stream are fully utilized. When a MPEG-2 video element stream (VES) is input into the transcoder, the initial average bit rate R is already known. Obviously, the target transcoding bit rate R' is also known.

A calculation module 802 calculates the target number of bits B' and the quantization parameter Q' of each transcoded frame. In the implementation shown in FIG. 8, it is assumed that the bits of each frame in the input MPEG-2 VES are allocated at the constraint of a long virtual buffer just as in the traditional rate control techniques. It is also assumed that there is no buffer over-flow or buffer under-flow. Therefore, the target number of bits B' can be calculated by a linear model as follows:

$$B' = \alpha B. \quad (10)$$

where $\alpha = R'/R$

B represents the number of bits of the current frame in the input stream. The multiplier, $\alpha$, is the ratio of the target transcoding bit rate R' and the input average bit rate R. The quantization parameter Q' can be calculated by the following equation (11):

$$Q' = f(B', B, Q). \quad (11)$$

Here Q is the average quantization parameter of the current frame in the input MPEG-2 VES. The relationship between coded bits and quantization parameter may have many different representations. When they are described as a reciprocal relationship, the formula (11) can be written as $$Q' = \frac{RQ}{R'} \quad (12)$$

If the quantization parameter is allowed to change in each macroblock, Q'is used as a preliminary, or temporary, quantization parameter. The actual target quantization parameter may be further refined by a control module 804. The control module 804 allocates the target bits B' to each macroblock with a frame virtual buffer. The size of buffer is equal to the target bits B'. A difference module 706 determines the difference between the actual bits B" and the target bits B'. The difference is fed back into the calculating module 802 in the next frame.

Another implementation of the calculating module 802 uses another approach. When the number of target bits B' in a certain frame is calculated, it is useful to consider the differences between the number of target bits B' and the actual number of bits B" in previous frames. During operation, B' is calculated using equation (10) only on the first frame of each group of pictures (GOP) or the beginning of a sequence. For subsequent frames, the calculating module 802 applies a different algorithm.

Assume there are N frames to be transcoded. The following formula is used to calculate the ratio $$\alpha = \left(R' \times N - \sum_{i=1}^{k-1} B''(i)\right) / \left(R \times N - \sum_{i=1}^{k-1} B(i)\right). \quad (13)$$

Here B"(i) and B(i) are the number of bits for frame i in the transcoded bit stream and the input bit stream (i.e., input video data), respectively. The target number of bits B' (k) for frame k can be represented as follows:

$$B'(k) = \alpha \times B(k) \quad (14)$$

Moreover, for different frame type, we can use a weight factor to modify the target bit number to get better frame quality, and then we can re-write the above equation as $$B'(k) = w \times \alpha \times B(k) \quad (15)$$

The value w is the weighting factor for I, P, or B frame, respectively.

The control module 804 implements a macroblock level control scheme. The macroblock level control scheme ensures that the target number of bits B' for each picture is met, and optimizes the quantization parameter for each macroblock based on R-D relationship which would produce a minimum average distortion with rate constraint.

For jth macroblock, the distortion $d_j$ and the bit number $r_j(q_j)$ can be represents as follows.

$$d_j(q_j) = \frac{q_j^2}{12} \quad (16)$$

$$r_j(q_j) = \frac{x_j}{q_j} = \frac{r_j^0 \times q_j^0}{q_j} \quad (17)$$

Here, $r_j^o$ and $q_j^o$ are bit number and quantization parameter for the same macroblock in the input bit stream, and $x_j$ is the complexity of this macroblock. The complexity, $x_j$, can be estimated by multiplying $r_j^o$ and $q_j^o$. The quantization parameters in the transcoded bit stream can be calculated with the following optimization $$\min \sum_{j=1}^{N} d_j(q_j), \quad (18)$$

$$\text{subject to } \sum_{j=1}^{N} r_j(q_j) = B' \quad (19)$$

Here, B' is the target number of bits for this frame.

A Lagrangian method can be used to solve the above optimization problem.

$$J(\lambda) = \sum_{j=1}^{N} d_j(q_j) + \lambda \left( \sum_{j=1}^{N} r_j(q_j) - B' \right) = \sum_{j=1}^{N} \frac{q_j^2}{12} + \lambda \left( \sum_{j=1}^{N} \frac{x_j}{q_j} - B' \right). \quad (20)$$

By solving the above extremum, the quantization parameter for each macroblock can be represented as $$q_j = \frac{\sqrt[3]{x_j} \times \sum_{n=1}^{N} \sqrt[3]{x_n^2}}{B'}, n = 1, 2, \ldots, N. \quad (21)$$

The macroblock level rate control scheme implemented by the control module 804 is described as follows.

For macroblock j, the left target bit number is $$\Delta B = B' - \sum_{n=1}^{j-1} r_n(q_n),$$

where the sum item is the coded bits of previous j−1 macroblocks.

If $\Delta B \leq 0$, $q_j = Q_{avg}/j$, i.e., we do not calculate the quantization parameter again. Instead, the average value of previous j−1 macroblocks is used; otherwise.

$$q_j = \frac{\sqrt[3]{x_j} \times \sum_{n=j}^{N} \sqrt[3]{x_n^2}}{\Delta B}.$$

The difference of quantization parameters calculated in frame level and macroblock level is equal to $\Delta q_j = q_j - Q'$. If $\Delta q_j < -2$, then $\Delta q_j = -2$, else if $\Delta q_j > 2$, then $\Delta q_j = 2$. The final quantization parameter for macroblock j is $Q' + \Delta q_j$.

Exemplary Operation for Encoding Video Data at a Target Bit Rate

Figure 9:
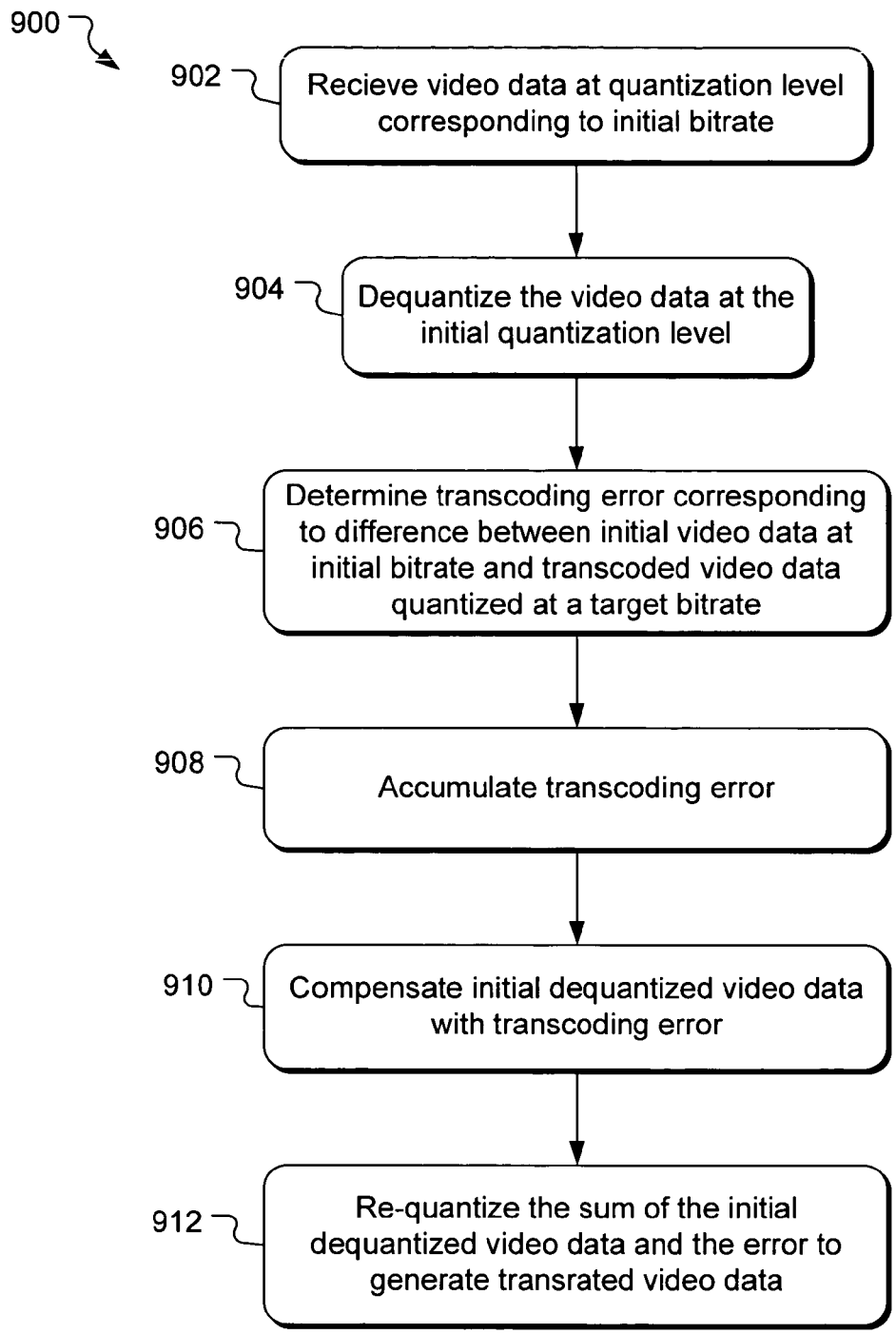
FIG. 9 illustrates an operation flow including exemplary operations for transcoding input video data at an original bit rate to output video data at a target bit rate.

FIG. 9 illustrates a transrating operation flow or algorithm 900 including exemplary operations for transcoding input video data encoded at an initial bit rate into output video data encoded at a target bit rate. The transrating operation flow 900 does not change the underlying format of the video data. For purposes of illustration, but not limitation, it is assumed that the video data is encoded according to the MPEG-2 format.

A receiving operation 902 receives the initial video data encoded at an initial quantization level corresponding to an initial bit rate. Typically, the receiving operation 902 reads the initial video data from one or more files stored in memory from which the video data can be made available to clients, applications, or other users. As discussed above, the initial bit rate and initial quantization level of the initial video data is easily determined.

A dequantizing operation 904 dequantizes the initial video data using a quantization parameter corresponding to the initial bit rate. The output of the dequantizing operation 904 includes one or more discrete cosine transform (DCT) coefficients. The DCT coefficients are compression coefficients that represent the initial video data in the frequency domain.

A determining operation 906 determines transcoding error, or drift error, corresponding to the difference between initial video data and the transrated video data in the frequency domain. Due to the linearity of the DCT, DCT coefficients of the transrated video data can simply be subtracted from the DCT coefficients of the initial video data.

An accumulating operation 908 accumulates the determined transcoding error. The accumulating operation 908 adds the determined transcoding error from one frame with transcoding error(s) from previously transrated video frame in order to account for the drift error associated with reducing the bit rate of the video data. In one implementation of the accumulating operation 908, drift error is accumulated in the pixel domain, rather than the frequency domain, and stored in an error buffer.

A compensating operation 910 combines the initial video data with the accumulated drift error to compensate the video data with the drift error. The compensating operation converts the accumulated drift error from the pixel domain to the frequency domain and then sums the accumulated drift error (in the frequency domain) with the dequantized DCT coefficients from the dequantizing operation 904. The output of the compensating operation 910 includes error-compensated compression coefficients.

A re-quantizing operation 912 re-quantizes the error-compensated compression coefficients using a target quantization parameter corresponding to the target bit rate. The target quantization parameter can be dynamically controlled on a frame-by-frame, or a macroblock-by-macroblock basis. The output data from the re-quantizing operation 912 are transrated compression coefficients that can be used to determine the drift error in the determining operation 906.

Figure 10:
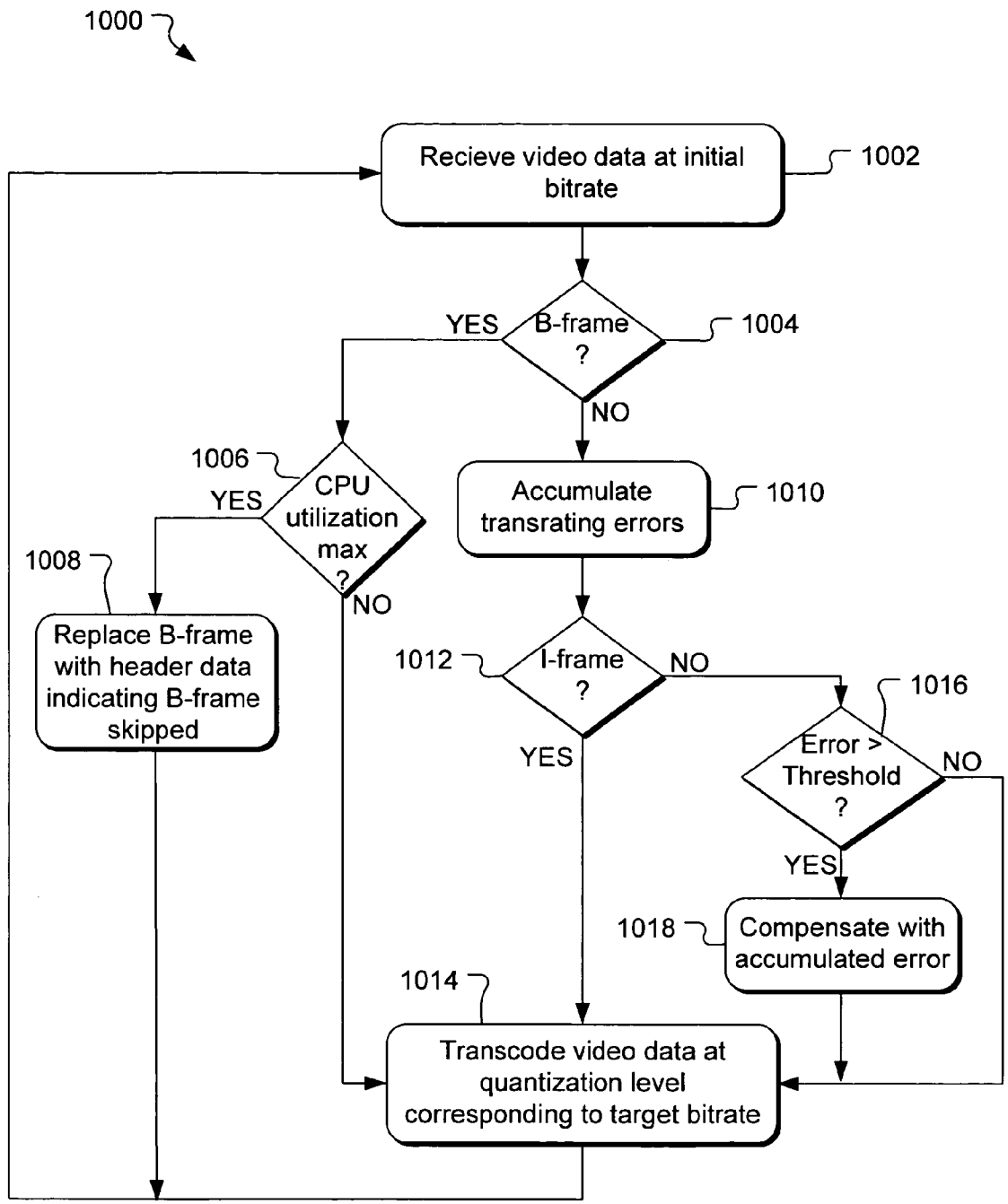
FIG. 10 illustrates an operation flow including exemplary operations for scaling complexity of a transcoder in response to system conditions and/or type of video frame.

FIG. 10 illustrates an adapting operation flow or algorithm 1000 including exemplary operations for scaling the complexity of a transcoder in response to system conditions and/or video frames. The algorithm 1000 can be implemented by the servers and transcoders discussed herein, as well as any general purpose computer. As with the description of FIG. 9, for illustration purposes, it is assumed that the video data that is transcoded is in the MPEG-2 format.

A receiving operation 1002 receives MPEG-2 video data encoded at an initial bit rate. A determining operation 1004 determines whether the video data is B-frame video data. The determining operation 1004 may be implemented with a variable length encoder (VLD), such as the VLD described above, which can extract frame-type information from video header data. If the determining operation 1004 determines that the video data is B-frame video, the adapting operation 1000 branches 'NO' to another determining operation 1006. The determining operation 1006 determines whether the central processing unit (CPU) is being utilized to its maximum capacity and hence cannot transcode the video data in real-time. One implementation of the determining operation 1006 determines whether the CPU has enough clock cycles available to transcode the video data in real-time.

If the determining operation 1006 determines that the CPU utilization is maximized, the adapting operation 1000 branches 'YES' to a replacing operation. The replacing operation 1008 replaces the B-frame data with only header data that indicates to the decoder that the B-frame has been skipped. The replacing operation 1008 then only transmits the header data and not the B-frame video data. After the replacing operation, the adapting operation returns to the receiving operation without transcoding the B-frame data.

Referring to the determining operation 1004, if it is determined that the video data is not B-frame data, the adapting operation branches 'NO' to an accumulating operation 1010. The accumulating operation 1010 generates and accumulates errors due to transrating. One implementation of the accumulating operation 1010 subtracts transrated video coefficients from the received video coefficients and adds the difference to accumulated error from previously transrated video data.

After the accumulating operation 1010, another determining operation 1012 determines whether the video data is I-frame video data. If it is determined that the video data is I-frame video data, the adapting operation branches 'YES' to a transcoding operation 1014, without compensating the video data with the accumulated transrating error.

Likewise, with regard to the determining operation 1006, if the determining operation 1006 determines that the CPU does have sufficient capacity to transcode in real-time, the adapting operation 1000 branches 'NO' to the transcoding operation 1014, which transcodes (e.g., re-quantizes, variable length encodes) the B-frame data without compensating with the accumulated error.

Referring again to the determining operation 1012, if it is determined that the video data is not I-frame data, then the video data is P-frame data, and the adapting operation 1000 branches 'NO' to another determining operation 1016. The determining operation 1016 determines whether the accumulated error due to transrating is greater than a predetermined threshold. If the accumulated error is not greater than a predetermined threshold, the adapting operation branches 'NO' to the transcoding operation, which transcodes the P-frame data at quantization levels corresponding to the target bit rate.

If the determining operation 1016 is determines that the accumulated error is greater than the predetermined threshold, the adapting operation branches 'YES' to a compensating operation 1018. The compensating operation 1018 compensates the input video data with the accumulated error in order to limit drift error. After the video data has been compensated, the transcoding operation 1014 re-quantizes and variable length encodes the error compensated video data at a quantization level corresponding to the target bit rate. The adapting operation 1000 may then return to the receiving operation 1002 to continue the transcoding process, if more video data is to be transcoded.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although some exemplary methods, devices and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A method for transcoding input video data encoded at an initial bit rate into output video data encoded at a target bit rate, the input video data and the output video data comprising one or more of an intra frame (I-frame), a predictive frame (P-frame), and a bidirectional frame (B-frame), the method implemented by a processor, the method comprising:

accumulating transcoding error associated with transcoding the input video data into the output video data to generate accumulated transcoding error;

motion-compensating the accumulated transcoding error to generate motion-compensated accumulated transcoding error;

error-compensating the input video data with the motion-compensated accumulated transcoding error to generate error-compensated video data;

determining whether the input video data comprises bidirectional frame (B-frame) video data;

determining whether utilization of the processor is greater than a predetermined maximum utilization; and if the input video data comprises B-frame video data and the utilization of the processor is greater than the predetermined maximum, applying a B-frame switching module operable to disable the accumulating, motion-compensating, and error-compensating operations from being applied to the B-frame video data, and inserting B-frame bypass data into the output video data, the B-frame bypass data indicating that the B-frame video data is not transcoded.

2. A method for transcoding input video data encoded at an initial bit rate into output video data encoded at a target bit rate, the input video data and the output video data comprising one or more of an intra frame (I-frame), a predictive frame (P-frame), and a bidirectional frame (B-frame), the method implemented by a processor, the method comprising:

accumulating transcoding error associated with transcoding the input video data into the output video data to generate accumulated transcoding error;

motion-compensating the accumulated transcoding error to generate motion-compensated accumulated transcoding error;

error-compensating the input video data with the motion-compensated accumulated transcoding error to generate error-compensated video data;

determining whether the motion-compensated accumulated transcoding error is less than a threshold value; and if the motion-compensated accumulated transcoding error is less than the threshold value, applying a compensating switching module to prevent the error-compensating operation.

3. A method as recited in claim 2 wherein the determining whether the motion-compensated accumulated transcoding error is less than the threshold value comprises calculating an error metric; the error metric being a function of accumulated errors of pixels in a video block.

4. A method as recited in claim 3 wherein calculating the error metric comprises calculating an absolute error of an 8×8 video block according to an equation) the equation being:

$$S = \sum_{i=0}^{7} \sum_{j=0}^{7} |e(i, j)|,$$

wherein s represents the absolute error, e(i,j) represents accumulated error of each pixel in the 8×8 block, and i and j represent indices to pixels in the 8×8 block.

5. A method as recited in claim 2 further comprising setting the threshold value equal to one of a plurality of predetermined threshold values based on one or more of frame-type of the input, video data based and whether the error-compensating operation is disabled.

6. A method as recited in claim 1, further comprising:

determining whether the input video data comprises intra-frame (I-frame) video data; and if the input video data comprises I-frame video data, applying a compensating switching module to disable the error-compensating operation.

7. A method as recited in claim 1 wherein the selectively disabling operation comprises applying an open-loop switching module to prevent the accumulating, motion-compensating, and error-compensating operations.

8. A method as recited in claim 1 further comprising determining an initial re-quantization parameter to apply to the error-compensated video data to achieve the target bit rate, the determining comprising applying an equation, the equation being:

$$Q' = \frac{RQ}{R'},$$

wherein Q' represents the initial re-quantization parameter, R represents the initial bit rate, Q represents a quantization parameter associated with the input video data encoded at the initial bit rate, and R' represents the target bit rate.

9. A method as recited in claim 8 further comprising determining a secondary re-quantizing parameter according to an equation, the equation being:

$$q_j = \frac{\sqrt[3]{x_j} \times \sum_{n=1}^{N} \sqrt[3]{x_n^2}}{B'}, n = 1, 2, \ldots, N,$$

wherein N represents a number of frames in the input video data, $q_j$ represents the quantization parameter for a jth macroblock in a frame of the input video data, B' represents a target number of bits in a frame of the output video data, n represents the total number of macroblocks in a frame, and $x_n$ represents a complexity of the nth macroblock.

10. A method as recited in claim 9 further comprising calculating the target number of bits, B', according to an equation, the equation being:

B'=αB, wherein α represents a ratio of the target bit rate to the initial bit rate and B represents the number of bits of the current frame in the input video data.

11. A method as recited in claim 9 further comprising calculating the target number of bits, B', according to an equation, the equation being:

B'=wαB, wherein α represents a ratio of the target bit rate to the initial bit rate, w represents weighting factor, and B represents the number of bits of the current frame in the input video data.

12. A method as recited in claim 10 further comprising determining a difference between the target number of bits and an actual number of bits encoded in a frame of the output video data, the determining comprising applying an equation, the equation being:

$$\Delta B = B' - \sum_{n=1}^{j-1} r_n(q_n),$$

wherein ΔB represents the difference between the target number of bits and the actual number of bits encoded in the frame of output video data, B' represents the target number of bits, $r_n$ represents the number of bits in an nth macroblock of the frame, $q_n$ represents the quantization parameter of the nth macroblock of the frame, j represents a number of macroblocks in the frame, and n is an index variable that indexes sequentially through the macroblocks in the frame.

13. A method as recited in claim 12 further comprising: determining whether ΔB is greater than zero; and if ΔB is greater than zero, recalculating the quantization parameter $q_j$ according to an equation, the equation being:

$$q_j = \frac{\sqrt[3]{x_j} \times \sum_{n=1}^{N} \sqrt[3]{x_n^2}}{\Delta B}, n = 1, 2, \ldots, N.$$

14. A method as recited in claim 13 further comprising: determining a difference re-quantization parameter, $\Delta q_j$, according to an equation, the equation being:

$\Delta q_j = q_j - Q'$; and adding $\Delta q_j$ to Q' to generate a target re-quantization parameter.

15. A method as recited in claim 1 further comprising re-quantizing the error-compensated video data, the re-quantizing comprising looking up a target quantization parameter in a look-up table having a plurality of quantization parameters to achieve the target bit rate.

16. A method as recited in claim 1 wherein the accumulating operation comprises accumulating transcoding error in a frequency domain.

17. A system for transcoding input video data encoded at an initial bit rate into output video data encoded at a target bit rate, the input video data and the output video data comprising one or more of an intra frame (I-frame), a predictive frame (P-frame), and a bidirectional frame (B-frame), the system comprising:

an accumulating module accumulating transcoding error associated with transcoding the input video into the output video data to generate accumulated transcoding error;

a motion compensation module compensating the accumulated transcoding error with motion estimation data to generate motion-compensated accumulated transcoding error;

an error-compensating module compensating the input video data with the motion-compensated accumulated transcoding error to generate error-compensated video data;

a re-quantization module controlling a re-quantization level to achieve the target bit rate; and a compensation switching module operable to disable the error-compensating module in response to the motion-compensated accumulated transcoding error being less than a threshold value.

18. A system as recited in claim 17 further comprising a B-frame switching module operable to disable the accumulating module and the compensating module if the input video data comprises bidirectional frame (B-frame) video data.

19. A system as recited in claim 17 wherein the re-quantization module uses rate information and a quantization parameter in the input video data to determine a re-quantization parameter.

20. A system as recited in claim 19 wherein the re-quantization module comprises a look-up table, the look-up table outputting a re-quantization level and a re-quantization error corresponding to the target bit rate if the input video data comprises a value in a first range.

21. A system as recited in claim 20 wherein the re-quantization module further comprises:

a dequantization/quantization path, the dequantization/quantization path used to determine the re-quantization level and the re-quantization error associated with the target bit rate if the input video data comprises a value in a second range; and a level switching module operable to detect the value of the input video data and select the look-up table if the value is in the first range and otherwise select the dequantization/quantization path.

22. A system as recited in claim 20 wherein the look-up table is user-modifiable.

23. A system as recited in claim 21 wherein the first range and the second range are user-selectable.

24. A system as recited in claim 21 wherein the re-quantization module further comprises an error calculating module, the error calculating module determining transcoding error as a function of an element in the input video data, an initial quantization parameter associated with the initial bit rate, a target quantization parameter associated with the target bit rate, and a quantization parameter corresponding to the element in the video data.

25. A system as recited in claim 24 wherein the re quantization module re-quantizes an element of the input video data to a corresponding element of the output video data using an equation, the equation being:

$$X_3 = \frac{X_3' \times q_m}{16},$$

wherein $X_3$ represents the corresponding element of the output video data, $X_3'$ represents a preliminary re-quantized element obtained from the look-up table based on the element of the input video data, and $q_m$ represents the quantization parameter corresponding to the element in the input video data.

26. A system as recited in claim 24 wherein the error calculating module determines the transcoding error based on an equation, the equation being:

$$X_5 = \frac{X_5' \times q_m}{16},$$

wherein $X_5$ represents the transcoding error associated with the element, $X_5'$ represents a preliminary re-quantization error obtained from the look-up table based on the element of the input video data, and $q_m$ represents the quantization parameter corresponding to the element in the input video data.

27. A system as recited in claim 17 wherein the input video data comprises video data encoded according to a Motion Picture Experts Group-2 (MPEG-2) video format and the output video data comprises video data encoded according to an MPEG-2 format.

28. A computer storage media having stored thereon computer-executable instructions for causing a computer to perform a method comprising:

accumulating transcoding error associated with transcoding input video having an associated initial bit rate into output video data having an associated target bit rate, to generate accumulated transcoding error;

motion-compensating the accumulated transcoding error to generate motion-compensated accumulated transcoding error;

error-compensating the input video data with the motion-compensated accumulated transcoding error to generate error-compensated video data; and selectively disabling one or more of the accumulating and the error-compensating operations in response to detecting one or more conditions related to transcoding the input video data by:

selecting an error threshold from a plurality of predetermined error thresholds; and disabling the error-compensating operation if the motion-compensated accumulated transcoding error is less than the error threshold.

29. A computer storage media as recited in claim 28, further comprising computer-executable instructions for causing the processor to selectively disable one or more of the accumulating and the error-compensating operations in response to detecting one or more conditions related to transcoding the input video data by:

determining whether the input video data comprises bidirectional frame (B-frame) video data;

determining whether the processor is being utilized at a utilization rate greater than a predetermined utilization rate; and if the input video data comprises B-frame video data and the processor is being utilized at a utilization rate greater than a predetermined utilization rate, disabling the accumulating operation and the error-compensating operation.

30. A computer storage media as recited in claim 28, the method further comprising re-quantizing the error-compensated video data using a re-quantization parameter corresponding to the target bit rate.

31. A computer storage media having stored thereon computer-executable instructions for causing a computer to perform a method comprising:

accumulating transcoding error associated with transcoding input video having an associated initial bit rate into output video data having an associated target bit rate, to generate accumulated transcoding error;

motion-compensating the accumulated transcoding error to generate motion-compensated accumulated transcoding error;

error-compensating the input video data with the motion-compensated accumulated transcoding error to generate error-compensated video data; and selectively disabling one or more of the accumulating and the error-compensating operations in response to detecting one or more conditions related to transcoding the input video data;

determining a preliminary re-quantization parameter based on a function of the initial bit rate, the target bit rate, and an initial quantization parameter corresponding to the initial bit rate of the input video data;

determining a target number of bits in a frame of the output video data, the target number of bits being based on a function of an initial number of bits in a frame of the input video data, the initial bit rate, and the target bit rate;

determining a macroblock re-quantization parameter associated with a macroblock in the frame of the output video data, the macroblock re-quantization parameter being determined based on a function of a complexity value associated with the macroblock and the target number of bits in the frame of the output video data;

determining a re-quantization difference by subtracting the preliminary quantization parameter from the macroblock re-quantization parameter;

adding the re-quantization difference to the preliminary quantization parameter to generate a target re-quantization parameter; and re-quantizing the error-compensated video data using the target re-quantization parameter.

32. A computer storage media as recited in claim 31, wherein the determining a target number of bits in a frame of the output video data comprises calculating the target number of bits according to an equation, the equation being:

$$B'=(R'/R) \times B,$$

wherein B' represents the target number of bits in the frame of the output video data, R' represents the target bit rate, R represents the initial bit rate, and B represents the initial number of bits in the frame of the input video data.

33. A computer storage media as recited in claim 31, wherein the determining a preliminary re-quantization parameter comprises calculating the preliminary re-quantization parameter according to an equation, the equation being:

$$Q'=(R'/R) \times Q,$$

wherein Q' represents the preliminary re-quantization parameter, R' represents the target bit rate, R represents the initial bit rate, and Q represents the initial quantization parameter associated with the initial bit rate of the input video data.

34. A computer storage media as recited in claim 28, wherein the accumulating operation comprises subtracting discrete cosine transform coefficients associated with the output video data from discrete cosine transform coefficients associated with the input video data.

* * * * *